United States Patent
Popovici et al.

(10) Patent No.: US 8,600,973 B1
(45) Date of Patent: Dec. 3, 2013

(54) REMOVING SUBSTITUTION RULES

(75) Inventors: Dan Popovici, Cupertino, CA (US); Jeremy D. Hoffman, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/342,560

(22) Filed: Jan. 3, 2012

(51) Int. Cl.
*G06F 17/30* (2006.01)

(52) U.S. Cl.
USPC ............ 707/708; 707/706; 707/723; 707/769

(58) Field of Classification Search
USPC .................................. 707/708, 769
See application file for complete search history.

(56) References Cited

U.S. PATENT DOCUMENTS

| | | | | |
|---|---|---|---|---|
| 4,164,025 A | * | 8/1979 | Dubnowski et al. | 715/210 |
| 2003/0167266 A1 | * | 9/2003 | Saldanha et al. | 707/6 |
| 2007/0011154 A1 | * | 1/2007 | Musgrove et al. | 707/5 |
| 2010/0010968 A1 | * | 1/2010 | Redlich et al. | 707/3 |
| 2012/0158685 A1 | * | 6/2012 | White et al. | 707/706 |

* cited by examiner

*Primary Examiner* — Shyue Jiunn Hwa
(74) *Attorney, Agent, or Firm* — Fish & Richardson P.C.

(57) ABSTRACT

Methods, systems, and apparatus, including computer programs encoded on a computer storage medium, for removing substitution rules. According to one implementation, a method includes identifying a revised search query that was revised to include a substitute term of a query term; identifying search results that were generated using the revised search query, wherein each search result references a resource; determining, by one or more computers, that none of the resources referenced by a subset of the search results include the substitute term of the query term; and in response to determining that none of the resources referenced by the subset of search results include the substitute term of the query term, incrementing a no-match score for the substitute term.

24 Claims, 5 Drawing Sheets

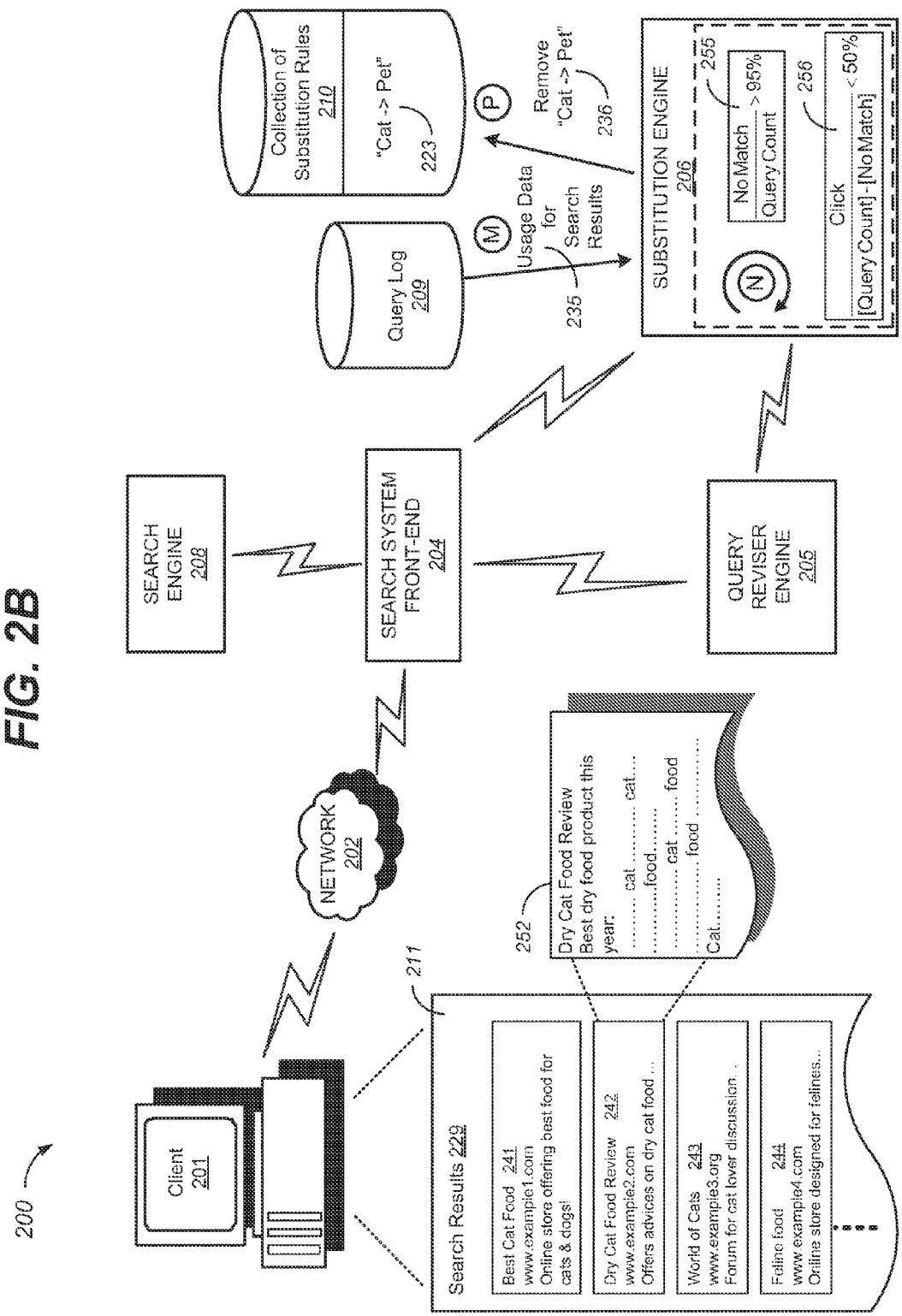

REMOVING SUBSTITUTION RULES

BACKGROUND

This specification generally relates to search engines, and one particular implementation relates to evaluating substitute terms that are used in revising search queries.

SUMMARY

In general, one innovative aspect of the subject matter described in this specification can be implemented in methods that include the actions of receiving a search query, and revising the search query to include a substitute term of a query term. The top search results of the revised search query are evaluated to determine whether the substitute term occurs in one or more of the resources referenced by the search results. If the substitute term does not occur in these resources, a no-match score is incremented for the substitute term and the query term. Over time, as additional search results are evaluated, the no-match score for the substitute term and the query term can be evaluated to determine whether or not to continue revising search queries using the substitute term.

According to another innovative aspect of the subject matter described in this specification, a method includes identifying a revised search query that was revised to include a substitute term of a query term. The method also includes identifying search results that were generated using the revised search query, where each search result references a resource, determining, by one or more computers, that none of the resources referenced by a subset of the search results include the substitute term of the query term, and in response to determining that none of the resources referenced by the subset of search results include the substitute term of the query term, incrementing a no-match score for the substitute term.

Other implementations of this aspect include corresponding systems, apparatus, and computer programs, configured to perform the actions of the methods, encoded on computer storage devices.

These and other implementations can each optionally include one or more of the following features. For instance, the method includes identifying a plurality of revised search queries that were revised to include the substitute term of the query term, where the plurality of revised search queries include the revised search query, determining that a no-match ratio between the no-match score for the substitute term and a count of the plurality of revised search queries does not satisfy a no-match ratio threshold, and in response to determining that the no-match ratio for the substitute term does not satisfy the no-match ratio threshold, removing a rule that revises search queries to include the substitute term; the method includes determining that one or more of the search results referenced by the subset of the search results include the substitute term of the query term, in response to determining that one or more of the search results referenced by the subset of the search results include the substitute term of the query term, incrementing a match count, determining that the one or more of the search results have been selected, and in response to determining that the one or more search results have been selected, incrementing a click score for the substitute term; the method includes identifying a plurality of revised search queries that were revised to include the substitute term of the query term, where the plurality of revised search queries include the revised search query, determining that a no-match ratio between the no-match score for the substitute term and a count of the plurality of revised search queries does not satisfy a no-match ratio threshold, determining that a click ratio between the click score for the substitute term and the match count does not satisfy a click ratio threshold, and in response to determining that (i) the no-match ratio for the substitute term does not satisfy the no-match ratio threshold and (ii) the click ratio for the substitute term does not satisfy the click ratio threshold, removing a rule that revises search queries to include the substitute term; the method includes identifying a plurality of revised search queries that were revised to include the substitute term of the query term, where the plurality of revised search queries include the revised search query, determining that a no-match ratio between the no-match score for the substitute term and a count of the plurality of revised search queries does not satisfy a no-match ratio threshold, determining that a click ratio between the click score for the substitute term and the match count does satisfy a click ratio threshold, and in response to determining that (i) the no-match ratio for the substitute term does not satisfy the no-match ratio threshold and (ii) the click ratio for the substitute term does satisfy the click ratio threshold, retaining a rule that revises search queries to include the substitute term; the method includes identifying a plurality of revised search queries that were revised to include the substitute term of the query term, where the plurality of revised search queries include the revised search query, determining that a no-match ratio between the no-match score for the substitute term and a count of the plurality of revised search queries does not satisfy a no-match ratio threshold, determining that a click ratio between the click score for the substitute term and the match count does satisfy a click ratio threshold in a specific context, and in response to determining that (i) the no-match ratio for the substitute term does not satisfy the no-match ratio threshold and (ii) the click ratio for the substitute term does satisfy the click ratio threshold in the specific context, modifying a general context rule that revises search queries to include the substitute term, where the general context rule is modified to include the specific context; the method also includes identifying a plurality of revised search queries that were revised to include the substitute term of the query term, where the plurality of revised search queries include the revised search query, determining that a no-match ratio between the no-match score for the substitute term and a count of the plurality of revised search queries does not satisfy a no-match ratio threshold, determining that a click ratio between the click score for the substitute term and the match count does not satisfy a click ratio threshold, and in response to determining that (i) the no-match ratio for the substitute term does not satisfy the no-match ratio threshold and (ii) the click ratio for the substitute term does not satisfy the click ratio threshold, modifying a confidence score associated with the substitute term; the subset of the search result includes a top n of the search results, and/or the search results that are visible on an initial search engine results page.

Advantageous implementations may include one or more of the following features. A substitute term rule which does not improve search quality can be identified empirically from search result data. The search system can determine that a substitute term rule which generates only a few additional search results may still be helpful if the users respond to the substitute term rule with positive feedbacks. The search system can identify specific contexts of which the substitute term rule improves search quality and modify the general context substitute term rule accordingly.

The details of one or more implementations of the subject matter described in this specification are set forth in the

BRIEF DESCRIPTION OF THE DRAWINGS

FIGS. 2A and 2B are diagrams of an example system that removes substitution rules.

Like reference numbers and designations in the various drawings indicate like elements.

DETAILED DESCRIPTION

Figure 1:
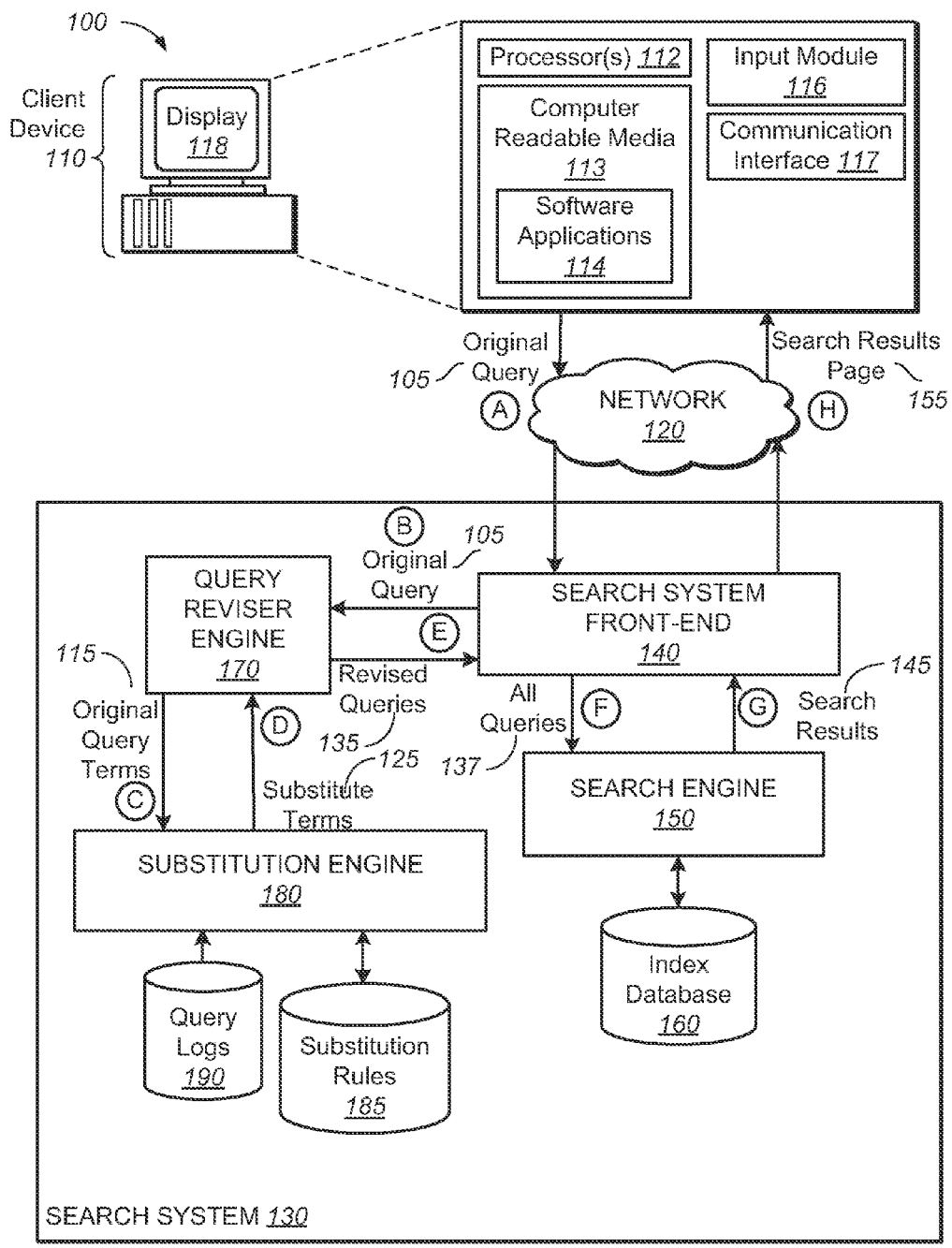
FIG. 1 is a block diagram illustrating an example system that can revise search queries using substitute terms.

FIG. 1 is a diagram of an example system 100 that can revise search queries using substitute terms. In general, the system 100 includes a client device 110 coupled to a search system 130 over a network 120. The search system 130 includes a search engine 150, a query reviser engine 170, and a substitution engine 180. The search system 130 receives a query 105, referred to by this specification as the "original query" or an "initial query," from the client device 110 over the network 120. The search system 130 provides a search results page 155, which presents search results 145 identified as being responsive to the query 105, to the client device 110 over the network 120.

In some implementations, the search results 145 identified by the search system 130 can include one or more search results that are identified as being responsive to queries that are different than the original query 105. The search system 130 can generate or obtain other queries in numerous ways (e.g., by revising the original query 105).

In some implementations, the search system 130 can generate a revised query by adding to the original query 105 additional terms that are substitute terms of one or more terms that occur in the original query 105. In other implementations, the search system 130 can generate a revised query by substituting terms that are substitute terms of terms that occur in the original query 105, in place of the terms in the original query 105. The substitution engine 180 can determine the additional terms that are candidate substitute terms for the one or more terms that occur in the original query. The query reviser engine 170 can generate the revised query. The search engine 150 can use the original query 105 and the revised queries to identify and rank search results. The search engine 150 can provide the identified search results 145 to the client device 110 on the search results page 155.

The substitution engine 180 can identify the substitute terms the query reviser engine 170 can use to generate revised queries by evaluating terms included in previously received queries stored in a query logs database 190. The queries stored in the query logs database 190 can include previous queries where a user considered the results of the queries desirable. For example, the user can "long click" the provided search results from a query, in effect, validating the search results. The queries stored in the query logs database 190 can include previous queries determined by the search system 130 as providing desirable results. For example, the search system 130 can perform a quality thresholding for returned search results from a query. The quality thresholding can include determining search results that have historically been returned for a particular query. Search results above the quality threshold can validate a query, which the search system 130 can then include in the query logs database 190.

For example, given a first term ("cat"), the substitution engine 180 can evaluate terms ("feline" or "banana") that are candidate substitute terms for the original term. In addition, the substitution engine 180 can determine that certain terms are substitute terms of the first term (as in the case of "feline"), and that other terms are not substitute terms of the first term (as in the case of "banana"). The substitution engine 180 can base this determination on rules stored in a substitution rules database 185. For example, a substitution rule can be "feline" is a substitute term for cat and "banana" is not a substitute term for cat.

The search system 130 can define substitution rules to apply generally, or to apply only when particular conditions, or "query contexts," are satisfied. For example, the query context of a substitution rule can specify one or more other terms that should be present in the query for the substitution rule to apply. Furthermore, query contexts can specify relative locations for the other terms (e.g., to the right or left of a query term under evaluation). In another example, query contexts can specify a general location (e.g., anywhere in the query). For example, a particular substitution rule can specify that the term "pet" is a substitute term for the query term "dog," but only when the query term "dog" is followed by the term "food" in the query. Multiple distinct substitution rules can generate the same substitute term for a given query term. For example, for the query term "dog" in the query "dog food," the term "pet" can be specified as a substitute term for "dog" by both a substitution rule for "dog" in the general context and a substitution rule for "dog" when followed by "food."

The substitution rules can depend on query contexts that define other terms in the original query 105. In other words, a substitution rule need not apply in all situations. For example, when the term "cats" is used as a single-term query, the term "felines" can be considered a substitute term for "cats". The substitution engine 180 can return the term "felines" to the query reviser engine 170 to generate a revised search query. In another example, when the query includes the term "cats" followed by the term "musical," a substitution rule can specify that the term "felines" is not a substitute term for "cats." In some implementations, the substitution rules can be stored in the substitution rules database 185 for use by the substitution engine 180, the query reviser engine 170, or the search engine 150.

In the illustrative example of FIG. 1, the search system 130 can be implemented as computer programs running on one or more computers in one or more locations that are coupled to each other through a network (e.g., network 120). The search system 130 includes a search system front-end 140 (e.g., a "gateway server") that coordinates requests between other parts of the search system 130 and the client device 110. The search system 130 also includes one or more "engines": the search engine 150, a query reviser engine 170, and the substitution engine 180.

As used in this specification, an "engine" (or "software engine") refers to a software implemented input/output system that provides an output that is different from the input. An engine can be an encoded block of functionality, such as a library, a platform, a Software Development Kit ("SDK"), or an object. The network 120 can include, for example, a wireless cellular network, a wireless local area network (WLAN) or Wi-Fi network, a Third Generation (3G) or Fourth Generation (4G) mobile telecommunications network, a wired Ethernet network, a private network such as an intranet, a public network such as the Internet, or any appropriate combination thereof.

The search system front-end 140, the search engine 150, the query reviser engine 170, and the substitution engine 180 can be implemented on any appropriate type of computing device (e.g., servers, mobile phones, tablet computers, notebook computers, music players, e-book readers, laptop or desktop computers, PDAs, smart phones, or other stationary or portable devices) that includes one or more processors and computer readable media. Among other components, the client device 110 includes one or more processors 112, computer readable media 113 that store software applications 114 (e.g., a browser or layout engine), an input module 116 (e.g., a keyboard or mouse), a communication interface 117, and a display device 118. The computing device or devices that implement the search system front-end 140, the query reviser engine 170, and the search engine 150 may include similar or different components.

In general, the search system front-end 140 receives the original query 105 from the client device 110. The search system front-end 140 routes the original query 105 to the appropriate engines included in the search system 130 so that the search system 130 can generate the search results page 155. In some implementations, routing occurs by referencing static routing tables. In other implementations, routing occurs based on the current network load of an engine, in order to accomplish load balancing. In addition, the search system front-end 140 can provide the resulting search results page 155 to the client device 110. In doing so, the search system front-end 140 acts as a gateway, or interface, between the client device 110 and the search engine 150.

Two or more of a search system front-end, a query reviser engine and a search engine (e.g., the search system front-end 140, the query reviser engine 170, and the search engine 150, respectively) may be implemented on the same computing device, or on different computing devices. Because the search system 130 generates the search results page 155 based on the collective activity of the search system front-end 140, the query reviser engine 170, and the search engine 150, the user of the client device 110 may refer to these engines collectively as a "search engine." This specification, however, refers to the search engine 150, and not the collection of engines, as the "search engine," since the search engine 150 identifies the search results 145 in response to the user-submitted query 105.

In some implementations, the search system 130 can include many computing devices for implementing the functionality of the search system 130. The search system 130 can process the received queries and generate the search results by executing software on the computing devices in order to perform the functions of the search system 130.

Referring to FIG. 1, during state (A), a user of the client device 110 enters original query terms 115 for the original query 105, and the client device 110 communicates the original query 105 to the search system 130 over the network 120. For example, the user can submit the original query 105 by initiating a search dialogue on the client device 110, speaking or typing the original query terms 115 of the original query 105, and then pressing a search initiation button or control on the client device 110. The client device 110 formulates the original query 105 (e.g., by specifying search parameters). The client device 110 transmits the original query 105 over the network 120 to the search system 130.

Although this specification refers to the query 105 as an "original" or an "initial" query, such reference is merely intended to distinguish this query from other queries, such as the revised queries that are described below. The designation of the original query 105 as "original" is not intended to require the original query 105 to be the first query that is entered by the user, or to be a query that is manually entered. For example, the original query 105 can be the second or subsequent query entered by the user. In another example, the original query 105 can be automatically derived (e.g., by the query reviser engine 170). In another example, the original query 105 can be modified based on prior queries entered by the user, location information, and the like.

During state (B), the search system front-end 140 receives the original query 105 and communicates the original query 105 to the query reviser engine 170. The query reviser engine 170 can generate one or more revised queries 135 based on the substance of the original query 105. In some implementations, the query reviser engine 170 generates a revised query by adding terms to the original query 105 using substitute terms 125 for terms in the original query 105. In other implementations, the query reviser engine 170 generates a revised query by substituting the substitute terms 125 for the corresponding terms of the original query 105. The query reviser engine 170 can obtain substitute terms 125 for use in revising the original query 105 from the substitution engine 180.

During state (C), the query reviser engine 170 communicates original query terms 115 of the original query 105 to the substitution engine 180. The substitution engine 180 can use substitution rules included in the substitution rules database 185 to determine one or more substitute terms 125 for one or more of the original query terms 115 of the original query 105.

The substitution engine 180 communicates substitute terms 125 to the query reviser engine 170 during state (D). The query reviser engine 170 generates one or more revised queries 135 by adding substitute terms 125 to the original query 105. The query reviser engine 170 can also add logical operators (e.g. "OR") between substitute terms 125 and the corresponding original query terms. In addition, the query reviser engine 170 can generate one or more revised queries 135 by substituting certain terms of the original query 105.

In some implementations, the query reviser engine 170 can mark each of the substitute terms 125 with a confidence score in the one or more revised queries 135. The confidence score associated with a substitute term may be stored at the substitution rule database 185 or another database not shown here in the search system 130. In some implementations, the substitution engine 180 may determine the confidence score for a substitute term from previous user interactions with the substitute term in the context of the original query 105. As one example, the determination of the confidence score for a substitute term may be based partly on whether a user has selected a particular search result generated by the revised query which includes the substitute term, where the particular search result is not included in the search results generated by the original query. As another example, the confidence score for a substitute term may be based partly on whether a user has skipped a particular search result generated by a revised query which includes the substitute term, where the particular search result is not included in the search results generated by the original query, and the particular search result is ranked higher than the selected search result among the search results returned to the user. In some other implementations, the substitution engine 180 may determine the confidence score of a substitute term from the search results generated by the original query 105. As one example, the confidence score for a substitute term may be partly based on a change in relative rankings among search results generated by the original and revised queries. As another example, the confidence score for a substitute term may be partly based on the number of new search results generated by the revised query. Alternatively, the administrator of the search system 130 may manually assign the confidence score to a substitute term The query reviser engine 170 communicates the one or more revised queries 135 to the search system front-end 140 during state (E). The search system front-end 140 communicates the original query 105 along with the one or more revised queries 135 to the search engine 150 as all queries 137 during state (F). The search engine 150 generates search results 145 that it identifies as being responsive to the original query 105 and/or the one or more revised queries 135. The search engine 150 can identify search results 145 for each query using an index database 160 that stores indexed resources (e.g., web pages, images, or news articles on the Internet). The search engine 150 can combine and rank the identified search results 145 and communicate the search results 145 to the search system front-end 140 during state (G).

The search system front-end 140 generates a search results page 155 that identifies the search results 145. For example, each of the search results 145 can include, but are not limited to, titles, text snippets, images, links, reviews, or other information. The original query terms 115 or the substitute terms 125 that appear in the search results 145 can be formatted in a particular way (e.g., in bold print and/or italicized print). For example, the search system front-end 140 transmits a document that includes markup language (e.g., HyperText Markup Language or eXtensible Markup Language) for the search results page 155 to the client device 110 over the network 120 at state (H). The client device 110 reads the document (e.g., using a web browser) in order to display the search results page 155 on display device 118. The client device 110 can display the original query terms 115 of the original query 105 in a query box (or "search box"), located, for example, on the top of the search results page 155. In addition, the client device 110 can display the search results 145 in a search results box, for example, located on the left-hand side of the search results page 155.

Figure 2A:
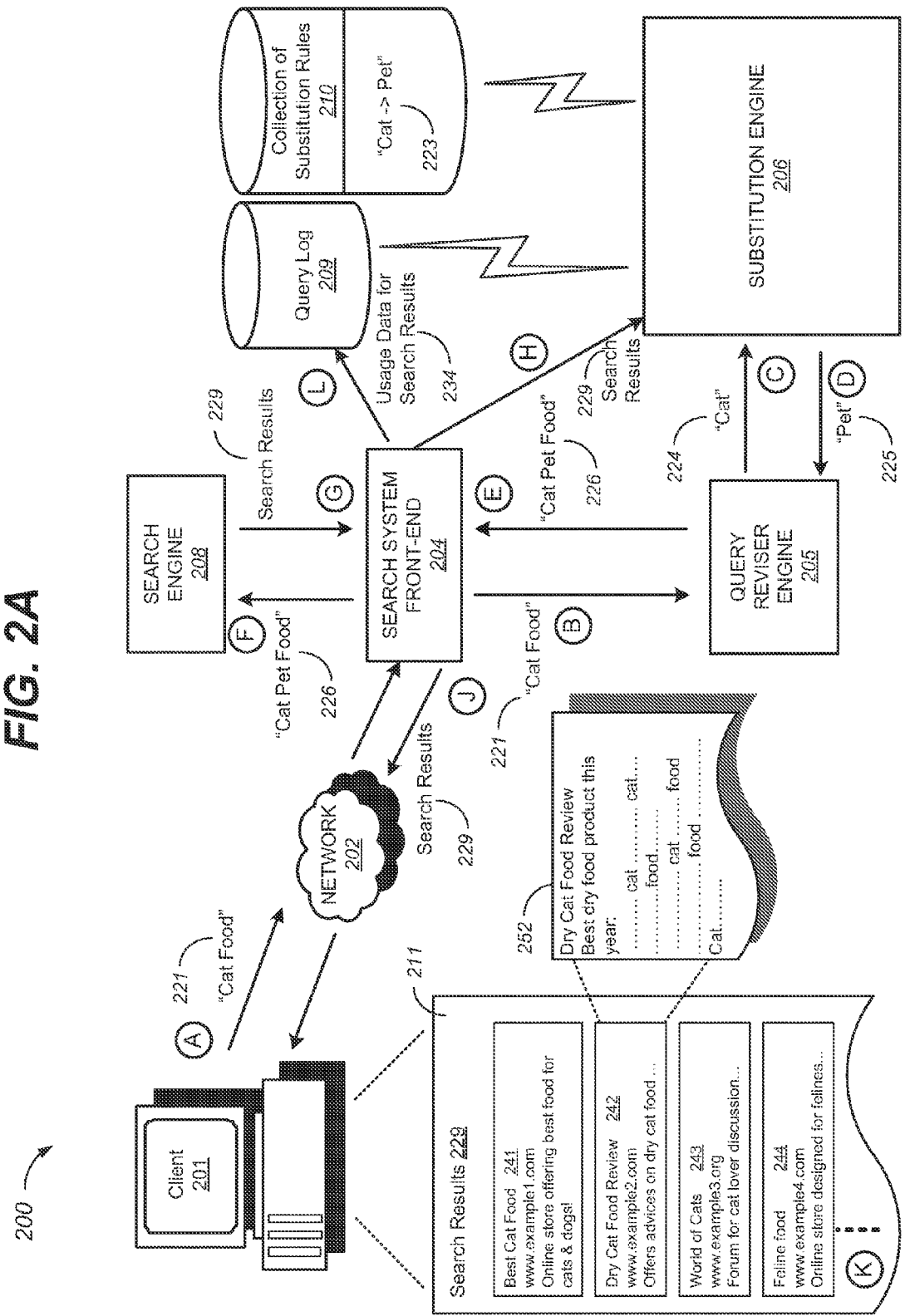

FIG. 2A and FIG. 2B are diagrams of an example system 200 that removes substitution rules. In general, when a user submits an original query to the system 200, the user may or may not know the best query terms for obtaining the most relevant search results. The system 200 may attempt to improve the search result quality in two phases.

In general, FIG. 2A describes the first phase, where the system 200 applies a substitution rule to revise the original query into a revised query. The system 200 then obtains a set of search results generated from the revised query, sends the search results to the user, and collects usage data on the search results from the user. FIG. 2B describes the second phase, where the system 200 analyzes an aggregation of search results and usage data related to the substitution rule over a specific period of time, and then determines whether to remove the substitution rule from the system 200, or to continue using the substitution rule. In general, the system 200 includes a client device 201, a network 202, a search system front-end 204, a query reviser engine 205, a substitution engine 206, a search engine 208, a query log 209, and a collection of substitution rules 210.

In general, the search system front-end 204 coordinates the requests and responses among the client device 201, the query reviser engine 205, the substitution engine 206, and the search engine 208. For example, when a user operating the client device 201 issues an original query, the original query can be routed to the search system front end 204 through the network 202. In some implementations, the search system front end 204 can forward the original query to the query reviser engine 205 to determine whether and how to revise the original query. Then, upon receiving a response including a revised query from the query reviser engine 205, the search system front-end 204 forwards the revised query to the search engine 208. Once the search engine 208 identifies search results, the search engine 208 sends the search results to the search system front-end 204. Then the search system front-end 204 sends the search results to the client device 201 and to the substitution engine 206.

In more detail, the query reviser engine 205 receives an original query from the search system front-end 204 as an input, and based on the substance of the original query, the query reviser engine 205 can generate a revised query by adding, substituting, or removing query terms in the original query. For example, the query reviser engine 205 can generate a revised query to include substitute terms of the original query terms. In some implementations, the query reviser engine 205 can generate a revised query using substitute terms of one or more of the original query terms. The query reviser engine 205 can obtain substitute terms for revising the original query from the substitution engine 206.

In more detail, the substitution engine 206 applies one or more substitution rules from a collection 210 of substitution rules to an input query term, and provides the query reviser engine 205 with a substitute term for the input query term. The collection 210 of substitution rules is, for example, a list or other data structure that specifies which substitute terms or substitution rules that a query reviser may use to revise search queries. In an alternative implementation, the collection 210 of substitution rules may be a list of substitute terms or substitution rules that a query reviser may not use to revise search queries. In some implementations, the substitution engine 206 can add a new substitution rule to the collection 210 upon evaluation of the new substitution rule. In some implementations, the substitution engine 206 can remove an existing substitution rule from the collection 210 upon evaluation of the existing substitution rule.

In some implementations, the search engine 208 can generate search results based on the collective activity of the search system front-end 204, the query reviser engine 205, and the substitution engine 206. For example, the search engine 208 can receive the revised query from the search system front-end 204, where the revised query may include substitute terms of the original query terms. The search engine 208 can then generate search results based on the revised query, and send the search results to the search system front-end 204.

The user query log 209 is a repository which stores usage data associated with search results. The usage data can be collected and aggregated over time based on users' interactions with search results, including the search results generated by revised queries based on substitution rules. The usage data can include information regarding the substitution rules applied to the original query terms, the search results generated by the search engine 208, and the users' interactions with the search results. In some implementations, users can opt-in to allow their usage data to be collected and stored in the user query log 209. In some implementations, users can opt-out to decline their usage data to be collected and stored in the user query log 209.

A substitution rule in the collection 210 is a rule which has been selected for use by a query reviser engine 205 in revising search queries. The selection can be determined by an evaluation or test under certain criteria. In some implementations, the substitution engine 206 performs the evaluation. In some implementations, substitution rules are stored in the collection 210 as a data structure. The data structure may be constructed in any type of format (e.g., text, binary, etc.), as long as the collection 210 can modify the data structure within the collection 210. In some implementations, the substitution rule can either be in the general context, in which the substitution rule applies regardless of other terms in the query, or the substitution rule can be context-specific, in which the substitution rule only applies when other particular words are in the query. For example, a substitution rule "(Y->Z)" indicates that a query reviser may revise search queries that include the query term "Y" to include the query term "Z."

FIG. 2A also illustrates an example flow of data describing the first phase of a process, shown in states (A) to (L). States (A) to (L) may occur in the illustrated sequence, or they may occur in a sequence that is different than in the illustrated sequence. In some implementations, one or more of the States (A) to (L) may occur offline, where the search system may perform computations when some users are not connected to the search system. During state (A), a user operating a client device 201 makes an original query 221 "Cat Food". The original query 221 is transmitted to the network 202, where the network 202 then routes the original query 221 to the search system front-end 204.

During state (B), the search system front-end 204 receives the original query 221, and forwards the original query 221 to the query reviser engine 205. The query reviser engine 205 analyzes the original query 221, and identifies that adding a substitute term to the original query term "Cat" in the original query 221 may improve the quality of the search results.

During state (C), the query reviser engine 205 sends the original query term 224 "Cat" to the substitution engine 206. In some implementation, the query reviser engine 205 may include a context for the original query term 224 (i.e. "Cat" in the context of "Food"). In this present example, only the original query term 224 "Cat" is sent to the substitution engine 206, indicating that the query reviser engine 205 is requesting a substitute term for the original query term 224 in the general context. In some implementations, the substitution engine 206 can identify one or more substitute terms for the original query term 224 by applying substitution rules from the collection 210 of substitution rules. Here, the collection 210 includes a substitution rule 223 "Cat->Pet," and based on the substitution rule 223, the substitution engine 206 determines a revised query term 225 "Pet" as the substitute term for the original query term 224 "Cat" in the general context.

During state (D), the substitution engine 206 sends the revised query term 225 "Pet" to the query reviser engine 205. In one implementation, the query reviser engine 205 may then substitute the original query term "Cat" with the revised query term "Pet." In another implementation, the query reviser engine 205 may include the revised query term 225 in the original query 221. Here, the query reviser engine 205 modifies the original query 221 to include the substitute term, and generates a revised query 226 "Cat Pet Food."

During state (E), the query reviser engine 205 sends the revised query 226 to the search system front-end 204. During state (F), the search system front-end 204 sends the revised query 226 to the search engine 208. The search engine 208 analyzes the revised query 226, and generates a set of search results 229. In some implementations, the search results 229 may include information regarding the titles, addresses, snippets, and links to the resources referenced by the search results. The resources can be in the form of word documents, pictures, videos, webpages, etc. Each of the resources referenced by the search results may or may not contain the substitute term (i.e. "Pet") included in the revised query 226.

During state (G), the search engine 208 sends the search results 229 to the search system front-end 204. In one implementation, the search engine 208 can generate the search results 229 into a data format which can be interpreted by and displayed on a browser software in the client device 201. In another implementation, the search engine 208 can send the search results 229 to the search system front-end 204 in a proprietary format (i.e. binary, text separated by delimiters, etc.) interpretable only by the search system, and the search system front-end 204 can then parse the search results and generate the search results 229 into a data format which can be interpreted and displayed by a browser program in the client device 201. In some implementations, the search engine 208 determines a quality score for each of the search results 229, where the quality score is associated with the resource referenced by the corresponding search result. The quality scores may or may not be dependent on the revised query 226 received at the search engine 208. In some implementations, the search results are then ranked according to their relative quality scores.

During state (H), the search system front-end 204 sends the search results 229 to the substitution engine 206. In some implementations, the search system front-end 204 can send the search results 229 directly to the substitution engine 206. In some implementations, the search system front-end 204 can store the search results 229 at an external storage system, and send the substitution engine the location of the search results 229. The substitution engine 206 can then access and store the search results 229 and associates the search results 229 with the substitution rule 223. As more users continue to make original queries which are revised according to the substitution rule 223 by the query reviser engine 205 and the substitution engine 206 over time, more search results associated with the substitution rule 223 can continue to accumulate.

During state (J), the search system front-end 204 sends the search results 229 to the client device 201 through the network 202. The browser software on the client device 201 interprets and displays the search results 229 to the user.

During state (K), the user interacts with the search results 229 on the display 211. In this present example, several search results are displayed to the user, including the top four, highest ranking search results 241 to 244. Within each search result, information including a title, a website address, and a snippet of the resource are presented to the user. When the user selects the search result 242, a resource 252 referenced by the search result 242 is retrieved through the network 202 and presented to the user. Here, the content of the resource 252 includes several instances of the original query terms "cat" and "food," but does not include the substitute term "Pet" as suggested by the substitution rule 223. In some implementations, the user's interaction with the search results 232 is then recorded and forwarded to the search system front-end 204 through the network 202.

During state (L), the search system front-end 204 forwards the user's interaction with the search results 229 to the query log 209, and the interaction is stored as usage data 234 in the query log 209. In some implementations, the usage data 234 may include the user response to the search results 229 (i.e. click on search result 234), the search results 229, the original query 221, and the revised query 226 generated by the substitution rule 223. The usage data associated with the substitution rule 223 can accumulate in the query log 209 over time, as more users continue to respond to search results generated from revised queries associated with the substitution rule 223.

FIG. 2B also illustrates an example flow of data describing the second phase of the process, shown in states (M) to (P).

States (M) to (P) may occur in the illustrated sequence, or they may occur in a sequence that is different than in the illustrated sequence. In some implementations, one or more of the States (M) to (P) may occur offline, where the search system may perform computations when some users are not connected to the search system. As one example, the substitution engine 206 may request an aggregation of usage data associated with a substitution rule over time offline. As another example, the substitution engine 206 may modify a substitution rule in the collection 210 of substitution rules offline. During state (M), the substitution engine 206 receives aggregated usage data 235 for search results associated with the substitution rule 223. In some implementations, the substitution engine 206 can directly request the aggregated usage data 235 from the query log 209. In some implementations, the query log 209 can send the aggregated usage data 235 to the substitution engine 206 periodically. In some implementations, the query log 209 can send the aggregated usage data 235 to the substitution engine 206 when the aggregated usage data 235 meets a criterion (i.e. reaching a pre-determined number of user responses).

During state (N), the substitution engine 206 evaluates the substitution rule 223 to determine a No Match score associated with the substitution rule 223. In some implementations, the substitution engine 206 evaluates the search results generated from all revised queries associated with the substitution rule 223 during a predetermined period of time. For each revised query, the substitution engine 206 can analyze the top n resources referenced by the search results associated with the revised query, where n is an adjustable parameter determined either manually or automatically by the substitution engine 206. In some other implementations, the substitution engine 206 can analyze the resources referenced by the search results which were displayed to the users on an initial search engine results page.

In this present example, the substitution engine 206 analyzes the top four search results 241 to 244 within the set of search results 229 associated with the user query 221. For each of the top four search results 241 to 244, the substitution engine 206 can retrieve the resources (i.e. resource 252) referenced by the search results 241 to 244. In some implementations, the substitution engine 206 can analyze each resource referenced by the top-four search results 241 to 244, and determine whether the substitute term 225 "Pet" suggested by the substitution rule 223 appears in any of the resources. In the event that none of the resources referenced by the top four search results 241 to 244 includes the substitute term 225, the substitution engine 206 can increment a No Match score for the substitution rule 223 by one. The substitution engine 206 can continue to iterate through all the top-four results generated by revised queries associated with the substitution rule 223 during the predetermined period of time, and a Query Count can be incremented after each revised query is analyzed.

The substitution engine 206 can then determine whether the search results associated with the substitution rule 223 improves search quality by testing the analyzed data against certain criteria. For example, as one criterion, the substitution engine 206 can determine whether the ratio between the No Match score and the Query Count is below a no-match score threshold. When the ratio exceeds the no-match score threshold, the substitution engine 206 can determines that the substitution rule 223 may improve search quality. The threshold can be manually determined by the administrator of the substitution engine 206, or can be automatically determined by the substitution engine 206 upon receiving the aggregated search results 229 and usage data 235 associated with the substitution rule 223. In this present example, the substitution engine 206 determines that for all the resources referenced by the top-four research results associated with all the user queries revised by the substitution rule 223, the ratio 255 between the No Match score and the Query Count exceeds a predetermined no-match score threshold of 95%; it indicates that over 95% of the resources referenced by the top-four search results do not contain the substitute term 225 "Pet," and the substitution engine 206 determines that the substitution rule 223 may not improve search quality.

In some implementations, the substitution engine 206 can further analyze the aggregated usage data 235 associated with the substitution rule 223, by selecting only those instances of the aggregated usage data 235 where one or more of the top n resources do contain the substitute term. In some implementations, the substitution engine 206 may define a Match Count as {(Query Count)−(No Match)} to represent the number of the selected instances. The substitution engine 206 can determine, for each instance of the selected usage data, whether the corresponding user has clicked the search result of which the resource referenced by the clicked search result contains the substitute term 225. If so, the substitution engine 206 can increment a Click score for the substitution rule 223. The substitution engine 206 can determine whether the substitution rule 223 improves search quality by the ratio between the Click score and the Match Count. In the case where the ratio {Click÷(Match Count)} exceeds a click score threshold, the substitution engine 206 determines that the substitution rule 223 improves search quality. In the case where the ratio {Click÷(Match Count)} does not exceed the click score threshold, the substitution engine 206 determines that the substitution rule does not improve search quality. In this present example, the substitution engine 206 determines that for the usage data 235 associated with the substitution rule 223, the ratio 256 between the Click score and the Match Count is below a predetermined click score threshold of 50%; it means that over 50% of the users presented with search results containing the substitute term 225 did not select the search results containing the substitute term 225, and the substitution engine 206 determines that the substitution rule 223 does not improve search quality.

In some implementations, the substitution engine 206 can use the ratio between the No Match score and the Query Count as an exclusive criterion to determine whether a particular substitution rule improves search quality. In some implementations, after the substitution engine 206 has determined that the particular substitution rule may not improve search quality under the criterion using the ratio between the No Match score and the Query Count, the substitution engine 206 can then use the ratio between the Click score and the Match Count to verify search quality improvement from the particular substitution rule. If the ratio between the Click score and the Match Count exceeds the click score threshold, the substitution engine 206 can still determine that the particular substitution rule does improve search quality although the substitute term generated with the particular substitution rule does not appear in most of the resources referenced by the top n search results.

During state (P), the substitution engine 206 has determined that the substitution rule 223 does not improve search quality, and issues an indication to the collection 210 to remove the substitution rule 223. The collection 210 then removes the substitution rule 223 from the list or other data structure that specifies which substitution rules that the query reviser engine 205 may use to revise search queries. In an alternative implementation, the collection 210 of substitution rules may add the substitute term 223 to a list of substitution rules that the query reviser engine 205 may not use to revise search queries.

Figure 3A:
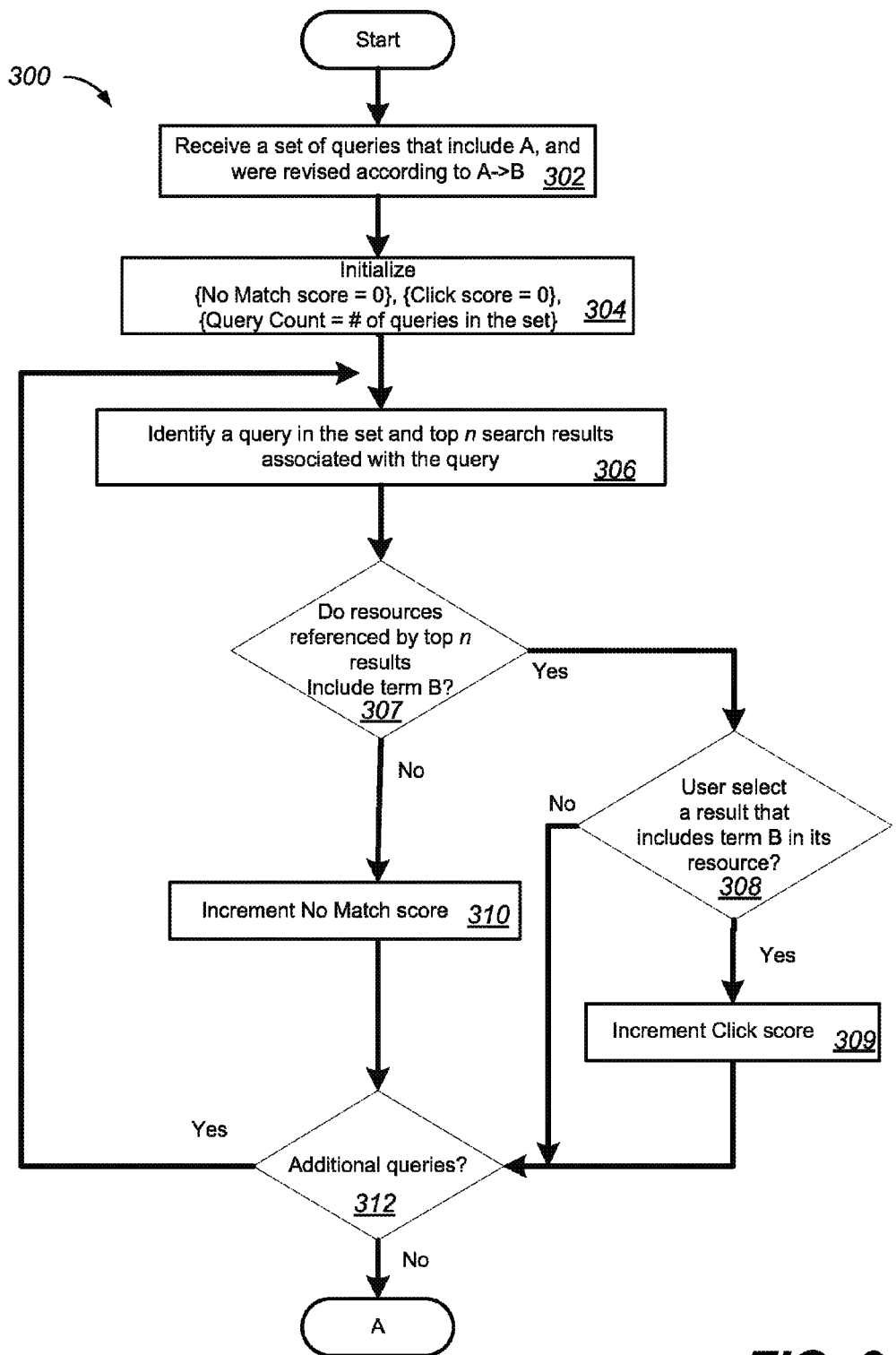
FIGS. 3A and 3B are flow charts illustrating an example process for adjusting the confidence level of a substitution rule based on the search results associated with queries revised by the substitution rule.
Figure 3B:
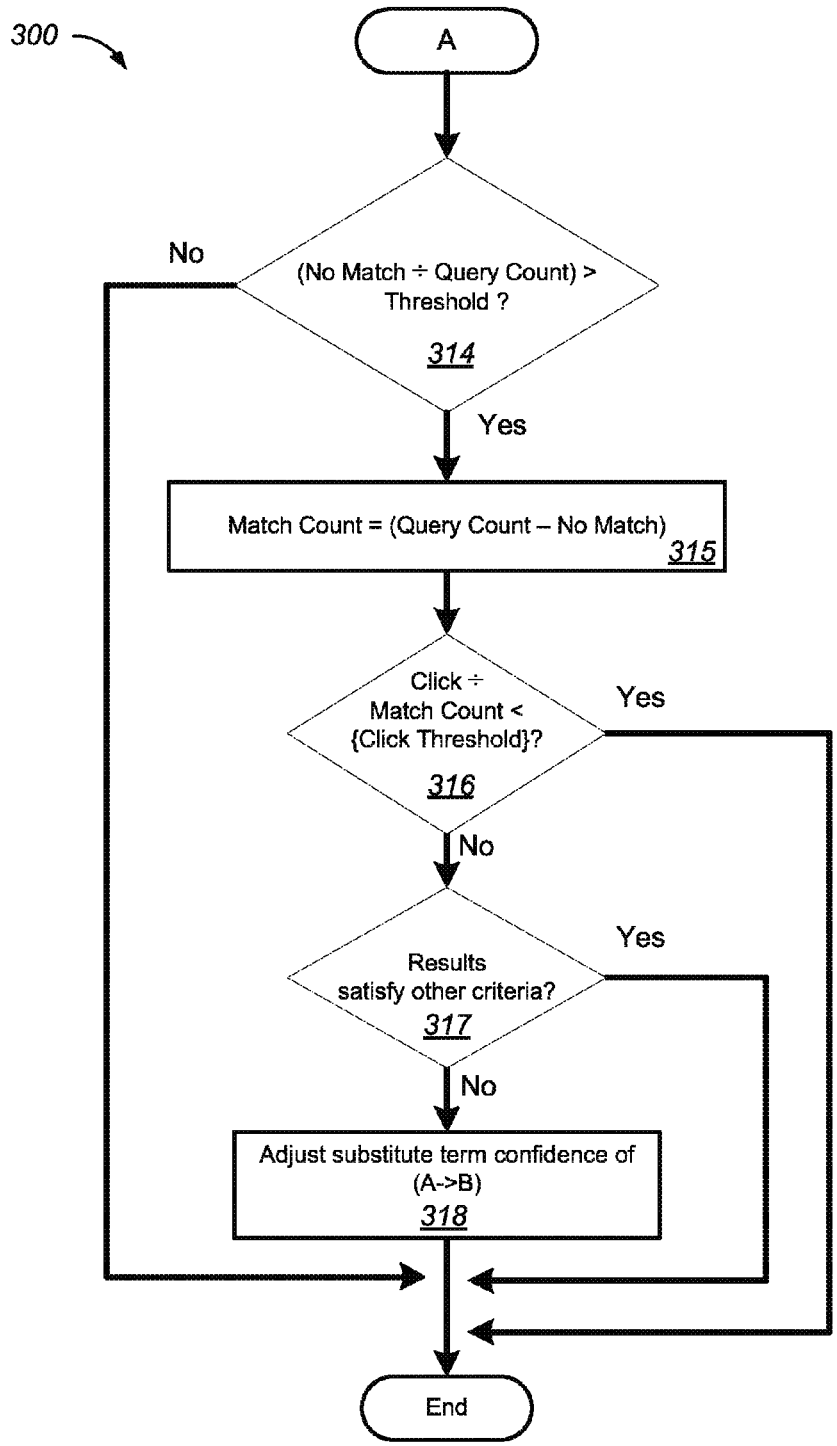

FIG. 3A and FIG. 3B are flow charts illustrating an example process 300 for adjusting the confidence level of a substitution rule based on the search results associated with queries revised by the substitution rule. In general, the process 300 analyzes search results and usage data associated with a substitution rule, and adjusts the confidence level of the substitution rule including removal of substitution rules which do not improve search quality. The process 300 will be described as being performed by a computer system comprising one or more computers, for example, the substitution engine 206 as shown in FIG. 2.

The system receives a set of revised search queries, where the revised search queries were revised to include a substitute term "B" of a query term "A", according to the substitution rule "A->B" (302). In some implementations, the system can also receive aggregated usage data associated with the revised search queries, including substitution rule applied to the original query, the search results generated by the revised queries, and the users' interactions to the search results. In general, the revised search queries can originate from various components in a search system. For example, the user query log is a repository which stores the revised search queries and the usage data. The revised search queries and the usage data associated with the substitution rule can be collected and aggregated over a specified period of time.

The system then initializes a No Match score and a Click score to zero and set a Query Count to the total number of queries received (304). In some implementations, the No Match score is a count of user queries that have returned search results of which none of the resources referenced by the top n search results corresponding to a particular revised query includes the substitute term as suggested by the substitution rule, where n is an adjustable parameter number determined either manually or automatically by the system. In some implementations, the Click score is a count of user queries where a user has selected a search result of which the resource referenced by the search result includes the substitute term as suggested by the substitution rule. The system can determine the No Match score and the Click score from the received usage data.

For each of the revised queries, the system identifies the top n search results that were generated using the revised search query, where each search result references a resource (306). In general, the system applies the substitution rule (i.e. "A->B") from a collection of substitution rules to the original query to generate the revised query. A search engine then generates search results based on the revised query. In some implementations, the search results may contain information including the result titles, addresses, snippets, and hyperlinks to the resources. The resources can be in the form of word documents, pictures, videos, webpages, etc. In some implementations, the search engine determines a quality score for each of the search results, where the quality score is associated with the resource referenced by the corresponding search result. The quality scores may or may not be dependent on the query received at the search engine. In some implementations, the search results are then ranked according to their relative quality scores.

For each of the revised queries, the system determines whether none of the resources referenced by the top n search results includes the substitute term of the query term (307). For the search results generated from a particular revised query associated with the substitution rule, one or more of the resources referenced by the search results may not contain the substitute term (i.e. "B"). In some implementations, the system can select the top n search results from the search results, and retrieve the resources referenced by the top n search results. For each resource, the system can analyze the resource and determine whether the substitute term is included in the resource.

In response to determining that none of the top n search results includes the substitute term, the system increments the No Match score by one (310). In response of determining that at least one of the resources among the top n search results includes the substitute term, the system determines whether the user has selected a search result which includes the substitute term in its corresponding resource (308). If so, the substitution engine can increment the Click score by one (309).

The system iterates through all the revised queries until all the top n search data associated with the revised queries have been analyzed (312). The system then compares the No Match score with the Query Count (314). In some implementations, the system can determine whether the ratio between the No Match score and the Query Count exceeds a no-match score threshold. The no-match score threshold can be manually determined by the administrator of the system, or can be automatically determined by the system upon receiving the revised queries and the usage data associated with the substitution rule. In the case where the ratio {(No Match)÷(Query Count)} does not exceed the no-match score threshold, the system determines that the substitution rule improves search quality.

In the case where the ratio {(No Match)÷(Query Count)} exceeds the no-match score threshold, the substitution engine determines that the substitution rule may not improve search quality. The system may then further analyze the aggregated usage data with other criteria. In some implementations, the system may define a Match Count as {(Query Count)−(No Match)} to represent the number of the selected instances where there is at least one resource among the top n resources that includes the substitute term term (315). The system can determine the substitution rule improves search quality by the ratio between the Click score and the Match Count (316). In the case where the ratio {Click÷(Match Count)} exceeds a click score threshold, the system determines that the substitution rule improves search quality. In the case where the ratio {Click÷(Match Count)} does not exceed the click score threshold, the system determines that the substitution rule may not improve search quality. The click score threshold can be different from the no-match score threshold defined in (314), and can be manually determined by the administrator of the system, or can be automatically determined by the system upon receiving the revised queries and the usage data associated with the substitution rule.

In the case where the ratio {(Click score)÷(Match Count)} does not exceed the click score threshold, the system may further analyze the search results and usage data to determine whether the results satisfy other criteria (317). As one example, the system can select only those instances of the revised queries and the aggregated usage data where one or more of the top n resources do contain the substitute term. In some implementations, the system may define a Match Count as {[Query Count]−[No Match]} to represent the number of the selected revised queries. The system determines, for each instance of the selected revised queries, whether the corresponding instances of the substitute term contained in the resources are associated with any specific context (i.e. "A->B" in the context of "C"). In some implementations, the system may define a Match Context score to represent the number of the selected revised queries that have resources containing the substitute term in a specific context. In some implementations, the system can determine whether the substitution rule in a specific context improves search quality by the ratio {(Match Context)÷(Match Count)}. In the case where the ratio {(Match Context)÷(Match Count)} exceeds a match-context score threshold, the system determines that the substitution rule improves search quality in the specific context, but does not improve search quality in the general context. In the case where the ratio {(Match Context) (Match Count)} does not exceed the match-context score threshold, the system determines that the substitution rule does not improve search quality in both the general context and the specific context. The match-context score threshold can be different from the no-match score threshold and the click score threshold defined in (314) or (316), and can be manually determined by the administrator of the system, or can be automatically determined by the system upon receiving the revised queries and the usage data associated with the substitution rule.

Once the system determines whether the substitution rule improves search quality in the general or specific context, the system adjusts the confidence of the substitution rule "A->B" (318). In some implementations, once the system has determined that the substitution rule does not improve search quality, the system can issue an indication to the collection to remove the substitution rule. In some other implementations, once the system has determined that the substitution rule does not improve search quality in the general context but improves search quality in a specific context, the system can issue an indication to the collection to remove the substitution rule in the general context but add or keep the substitution rule in the specific context. The collection can then remove the corresponding substitution rule from the list or other data structure that specifies which substitution rules may be used to revise search queries. In some other implementations, once the system has determined that the substitution rule does not improve search quality, the system can modify the confidence score of the substitute term associated with the substitution rule.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    determining a no-match score, a click score, and a query count for a query term substitution rule that is used to revise queries that include a query term, to include a substitute term for the query term,
        wherein the no-match score for the query term substitution rule indicates a quantity of revised search queries that (i) were generated using the query term substitution rule to include the query term and the substitute term, and (ii) were each used in identifying a respective set of search results that (I) were associated with text that did not include the substitute term, and (II) were included on a respective initial search engine results page,
        wherein the click score for the query term substitution rule indicates a quantity of revised search queries that (i) were generated using the query term substitution rule to include the query term and the substitute term, and (ii) were each used in identifying a respective set of search results, one or more of which were (I) associated with text that included the substitute term, (II) were selected by a user, and (III) were included on a respective initial search engine results page,
        wherein the query count for the query term substitution rule indicates a quantity of revised search queries that were generated using the query term substitution rule to include the query term and the substitute term; and
    determining whether to remove the query term substitution rule from a query revision model based on the no-match score, the click score, and the query count.

2. The method of claim 1, further comprising:
    determining that a no-match ratio between the no-match score and the query count does not satisfy a no-match ratio threshold; and
    in response to determining that the no-match ratio does not satisfy the no-match ratio threshold, removing the query term substitution rule.

3. The method of claim 1, further comprising:
   determining a match count for the query term substitution rule,
   wherein the match count for the query term substitution rule indicates a quantity of revised search queries that (i) were generated using the query term substitution rule to include the query term and the substitute term, and (ii) were each used in identifying a respective set of search results, one or more of which were associated with text that included the substitute term.

4. The method of claim 3, further comprising:
   determining that a no-match ratio between the no-match score and the query count does not satisfy a no-match ratio threshold;
   determining that a click ratio between the click score and the match count does not satisfy a click ratio threshold; and
   in response to determining that (i) the no-match ratio does not satisfy the no-match ratio threshold and (ii) the click ratio does not satisfy the click ratio threshold, removing the query term substitution rule.

5. The method of claim 3, further comprising:
   determining that a no-match ratio between the no-match score and the query count does not satisfy a no-match ratio threshold;
   determining that a click ratio between the click score and the match count does satisfy a click ratio threshold; and
   in response to determining that (i) the no-match ratio does not satisfy the no-match ratio threshold and (ii) the click ratio does satisfy the click ratio threshold, retaining the query term substitution rule.

6. The method of claim 3, further comprising:
   determining that a no-match ratio between the no-match score and the query count does not satisfy a no-match ratio threshold;
   determining that a click ratio between the click score and the match count does satisfy a click ratio threshold in a specific context; and
   in response to determining that (i) the no-match ratio does not satisfy the no-match ratio threshold and (ii) the click ratio does satisfy the click ratio threshold in the specific context, modifying the query term substitution rule to include the specific context.

7. The method of claim 3, further comprising:
   determining that a no-match ratio between the no-match score and the query count does not satisfy a no-match ratio threshold;
   determining that a click ratio between the click score and the match count does not satisfy a click ratio threshold; and
   in response to determining that (i) the no-match ratio does not satisfy the no-match ratio threshold and (ii) the click ratio does not satisfy the click ratio threshold, modifying a confidence score associated with the substitute term.

8. The method of claim 1, wherein the respective set of search results comprises top N search results of the search results.

9. A non-transitory computer-readable medium storing software having stored thereon instructions, which, when executed by one or more computers, cause the one or more computers to perform operations of:
   determining a no-match score, a click score, and a query count for a query term substitution rule that is used to revise queries that include a query term, to include a substitute term for the query term,
      wherein the no-match score for the query term substitution rule indicates a quantity of revised search queries that (i) were generated using the query term substitution rule to include the query term and the substitute term, and (ii) were each used in identifying a respective set of search results that (I) were associated with text that did not include the substitute term, and (II) were included on a respective initial search engine results page,
      wherein the click score for the query term substitution rule indicates a quantity of revised search queries that (i) were generated using the query term substitution rule to include the query term and the substitute term, and (ii) were each used in identifying a respective set of search results, one or more of which were (I) associated with text that included the substitute term, (II) were selected by a user, and (III) were included on a respective initial search engine results page,
      wherein the query count for the query term substitution rule indicates a quantity of revised search queries that were generated using the query term substitution rule to include the query term and the substitute term; and
   determining whether to remove the query term substitution rule from a query revision model based on the no-match score, the click score, and the query count.

10. The computer-readable medium of claim 9, wherein the operations further comprise:
    determining that a no-match ratio between the no-match score and the query count does not satisfy a no-match ratio threshold; and
    in response to determining that the no-match ratio does not satisfy the no-match ratio threshold, removing the query term substitution rule.

11. The computer-readable medium of claim 9, wherein the operations further comprise:
    determining a match count for the query term substitution rule,
    wherein the match count for the query term substitution rule indicates a quantity of revised search queries that (i) were generated using the query term substitution rule to include the query term and the substitute term, and (ii) were each used in identifying a respective set of search results, one or more of which were associated with text that included the substitute term.

12. The computer-readable medium of claim 11, wherein the operations further comprise:
    determining that a no-match ratio between the no-match score and the query count does not satisfy a no-match ratio threshold;
    determining that a click ratio between the click score and the match count does not satisfy a click ratio threshold; and
    in response to determining that (i) the no-match ratio does not satisfy the no-match ratio threshold and (ii) the click ratio does not satisfy the click ratio threshold, removing the query term substitution rule.

13. The computer-readable medium of claim 11, wherein the operations further comprise:
    determining that a no-match ratio between the no-match score and the query count does not satisfy a no-match ratio threshold;
    determining that a click ratio between the click score and the match count does satisfy a click ratio threshold; and
    in response to determining that (i) the no-match ratio does not satisfy the no-match ratio threshold and (ii) the click ratio does satisfy the click ratio threshold, retaining the query term substitution rule.

14. The computer-readable medium of claim 11, wherein the operations further comprise:

determining that a no-match ratio between the no-match score and the query count does not satisfy a no-match ratio threshold;

determining that a click ratio between the click score and the match count does satisfy a click ratio threshold in a specific context; and in response to determining that (i) the no-match ratio does not satisfy the no-match ratio threshold and (ii) the click ratio does satisfy the click ratio threshold in the specific context, modifying the query term substitution rule to include the specific context.

15. The computer-readable medium of claim 11, wherein the operations further comprise:

determining that a no-match ratio between the no-match score and the query count does not satisfy a no-match ratio threshold;

determining that a click ratio between the click score and the match count does not satisfy a click ratio threshold; and in response to determining that (i) the no-match ratio does not satisfy the no-match ratio threshold and (ii) the click ratio does not satisfy the click ratio threshold, modifying a confidence score associated with the substitute term.

16. The computer-readable medium of claim 9, wherein the respective set of search results comprises top N search results of the search results.

17. A system comprising:

one or more computers and one or more storage devices storing instructions that are operable, when executed by the one or more computers, to cause the one or more computers to perform operations comprising:

determining a no-match score, a click score, and a query count for a query term substitution rule that is used to revise queries that include a query term, to include a substitute term for the query term, wherein the no-match score for the query term substitution rule indicates a quantity of revised search queries that (i) were generated using the query term substitution rule to include the query term and the substitute term, and (ii) were each used in identifying a respective set of search results that (I) were associated with text that did not include the substitute term, and (II) were included on a respective initial search engine results page, wherein the click score for the query term substitution rule indicates a quantity of revised search queries that (i) were generated using the query term substitution rule to include the query term and the substitute term, and (ii) were each used in identifying a respective set of search results, one or more of which were (I) associated with text that included the substitute term, (II) were selected by a user, and (III) were included on a respective initial search engine results page, wherein the query count for the query term substitution rule indicates a quantity of revised search queries that were generated using the query term substitution rule to include the query term and the substitute term; and determining whether to remove the query term substitution rule from a query revision model based on the no-match score, the click score, and the query count.

18. The system of claim 17, wherein the operations further comprise:

determining that a no-match ratio between the no-match score and the query count does not satisfy a no-match ratio threshold; and in response to determining that the no-match ratio does not satisfy the no-match ratio threshold, removing the query term substitution rule.

19. The system of claim 17, wherein the operations further comprise:

determining a match count for the query term substitution rule, wherein the match count for the query term substitution rule indicates a quantity of revised search queries that (i) were generated using the query term substitution rule to include the query term and the substitute term, and (ii) were each used in identifying a respective set of search results, one or more of which were associated with text that included the substitute term.

20. The system of claim 19, wherein the operations further comprise:

determining that a no-match ratio between the no-match score and the query count does not satisfy a no-match ratio threshold;

determining that a click ratio between the click score and the match count does not satisfy a click ratio threshold; and in response to determining that (i) the no-match ratio does not satisfy the no-match ratio threshold and (ii) the click ratio does not satisfy the click ratio threshold, removing the query term substitution rule.

21. The system of claim 19, wherein the operations further comprise:

determining that a no-match ratio between the no-match score and the query count does not satisfy a no-match ratio threshold;

determining that a click ratio between the click score and the match count does satisfy a click ratio threshold; and in response to determining that (i) the no-match ratio does not satisfy the no-match ratio threshold and (ii) the click ratio does satisfy the click ratio threshold, retaining the query term substitution rule.

22. The system of claim 19, wherein the operations further comprise:

determining that a no-match ratio between the no-match score and the query count does not satisfy a no-match ratio threshold;

determining that a click ratio between the click score and the match count does satisfy a click ratio threshold in a specific context; and in response to determining that (i) the no-match ratio does not satisfy the no-match ratio threshold and (ii) the click ratio does satisfy the click ratio threshold in the specific context, modifying the query term substitution rule to include the specific context.

23. The system of claim 19, wherein the operations further comprise:

determining that a no-match ratio between the no-match score and the query count does not satisfy a no-match ratio threshold;

determining that a click ratio between the click score and the match count does not satisfy a click ratio threshold; and in response to determining that (i) the no-match ratio does not satisfy the no-match ratio threshold and (ii) the click ratio does not satisfy the click ratio threshold, modifying a confidence score associated with the substitute term.

24. The system of claim 17, wherein the respective set of search results comprises top N search results of the search results.

* * * * *